(12) United States Patent
Fujitake et al.

(10) Patent No.: US 11,951,844 B2
(45) Date of Patent: Apr. 9, 2024

(54) ELECTRIC VEHICLE (71) Applicant: TOYOTA JIDOSHA KABUSHIKI KAISHA, Toyota (JP)

(72) Inventors: Yoshinori Fujitake, Toyota (JP); Takatomo Asai, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 369 days.

(21) Appl. No.: 17/190,538

(22) Filed: Mar. 3, 2021

(65) Prior Publication Data
US 2021/0291661 A1 Sep. 23, 2021

(30) Foreign Application Priority Data
Mar. 18, 2020 (JP) .................................. 2020-047223

(51) Int. Cl.
*B60L 3/00* (2019.01)
*B60L 7/26* (2006.01)

(52) U.S. Cl.
CPC ............... *B60L 3/0076* (2013.01); *B60L 7/26* (2013.01); *B60L 2240/12* (2013.01)

(58) Field of Classification Search
None
See application file for complete search history.

(56) References Cited

U.S. PATENT DOCUMENTS

| 8,417,405 | B2 | 4/2013 | Niwa et al. | |
| 2017/0036547 | A1* | 2/2017 | Mizui | ........................ B60L 7/26 |
| 2018/0072305 | A1* | 3/2018 | Choi | ....................... B60W 10/11 |
| 2018/0201140 | A1* | 7/2018 | Shimizu | .................... B60T 1/10 |
| 2018/0265073 | A1* | 9/2018 | Kawanishi | ............ B60W 20/40 |

FOREIGN PATENT DOCUMENTS

| JP | H06-070406 A | 3/1994 |
| JP | 5460017 B2 | 4/2014 |
| JP | 5780041 B2 | 9/2015 |
| JP | 5837439 B2 | 12/2015 |
| JP | 2016-116271 A | 6/2016 |
| JP | 2017-73886 A | 4/2017 |

\* cited by examiner

*Primary Examiner* — Todd Melton
*Assistant Examiner* — Jason R Roberson
(74) *Attorney, Agent, or Firm* — Oliff PLC (57) ABSTRACT

An electric vehicle includes: a motor for traveling; an electric power storage device configured to supply and receive electric power to and from the motor; a controller configured to control the motor such that, when an accelerator is off, a braking force based on a traveling position selected from a plurality of traveling positions with different braking forces exhibited when the accelerator is off acts on the electric vehicle; and a notification unit that notifies information. the controller is configured, when the accelerator is off and a first maximum braking force output from the motor is limited more than a second maximum braking force of the traveling position selected when the accelerator is off, among the plurality of traveling positions, to cause the notification unit to notify limitation information indicating that the first maximum braking force is limited.

6 Claims, 8 Drawing Sheets

ELECTRIC VEHICLE

CROSS-REFERENCE TO RELATED APPLICATION

This application claims priority to Japanese Patent Application No. 2020-047223 filed on Mar. 18, 2020, incorporated herein by reference in its entirety.

BACKGROUND

1. Technical Field

The disclosure relates to an electric vehicle.

2. Description of Related Art

An electric vehicle of this type has been proposed that includes a motor for traveling and a battery for supplying and receiving electric power to and from the motor. In the electric vehicle, regeneration suppression control for suppressing the amount of regenerative braking by the motor is executed such that the battery voltage is equal to or lower than a predetermined value when the regenerative braking control of the motor is executed (see, for example, Japanese Unexamined Patent Application Publication No. 2016-116271 (JP 2016-116271 A)). In the electric vehicle, when the actual deceleration of the vehicle is smaller than the assumed deceleration based on the posture of the vehicle body, the accelerator operation amount, and the vehicle speed, the driver is notified that the regeneration suppression control is executed.

SUMMARY

For the above-mentioned electric vehicle, a case is not assumed that the electric vehicle has a plurality of traveling positions with different braking forces exhibited when the accelerator is off. Thus, in such an electric vehicle having a plurality of traveling positions, it is necessary to set a degree of limitation on the maximum braking force (maximum regenerative torque) that can be output from the motor, at which a notification that the maximum braking force is limited is issued.

The electric vehicle of the disclosure is an electric vehicle that has a plurality of traveling positions with different braking forces exhibited when the accelerator is off and that can notify at a more appropriate timing that the maximum braking force that can be output from the motor is limited.

An electric vehicle according to a first aspect of the disclosure includes: a motor for traveling; an electric power storage device configured to supply and receive electric power to and from the motor; a controller configured to control the motor such that, when an accelerator is off, a braking force based on a traveling position selected from a plurality of traveling positions with different braking forces exhibited when the accelerator is off acts on the electric vehicle; and a notification unit that notifies information. The controller is configured, when the accelerator is off and a first maximum braking force output from the motor is limited more than a second maximum braking force of the traveling position selected when the accelerator is off, among the plurality of traveling positions, to cause the notification unit to notify limitation information indicating that the first maximum braking force is limited.

With the above configuration, in the electric vehicle having a plurality of traveling positions with different braking forces exhibited when the accelerator is off, the limitation information can be notified at a more appropriate timing.

In the above aspect, the electric vehicle may be configured to select a desired traveling position from the plurality of traveling positions during traveling. The second maximum braking force may be a braking force of the traveling position, among the plurality of traveling positions, with a largest braking force exhibited when the accelerator is off. With this configuration, it is possible to restrain the relationship of magnitude between the first maximum braking force and the second maximum braking force from being switched due to an operation of changing the traveling position when the accelerator is off, as compared with a case where the second maximum braking force is a braking force of the current traveling position.

In the above aspect, the electric vehicle may be configured to select the traveling position at a time when the accelerator is off from the plurality of traveling positions only while the electric vehicle is stopped. The second maximum braking force may be a braking force of the traveling position selected from the plurality of traveling positions while the vehicle is stopped.

In the above aspect, the second maximum braking force may be a braking force of the traveling position for forward traveling, among the plurality of traveling positions, when a vehicle speed is positive. The second maximum braking force may be a braking force of the traveling position for backward traveling, among the plurality of traveling positions, when the vehicle speed is negative. With this configuration, the second maximum braking force can be set more appropriately in accordance with the sign of the vehicle speed.

In the above aspect, the electric vehicle may further include electric power equipment connected to a power line configured to connect the motor and the electric power storage device. The controller may be configured to set the second maximum braking force without considering at least one of power consumption and loss of the electric power equipment. Further, in the above aspect, the electric power equipment may be an air conditioner that conditions air in a vehicle cabin. With this configuration, it is possible to restrain the relationship of magnitude between the first maximum braking force and the second maximum braking force from being switched due to presence or absence of operation or power consumption of the air conditioner, when the accelerator is off.

In the above aspect, the controller may be configured, while the limitation information is being notified by the notification unit, to cause the notification unit to end the notification of the limitation information when any one of a first condition, a second condition, and a third condition is satisfied, the first condition being a condition that the first maximum braking force becomes equal to or larger than a cancel threshold value that is larger than the second maximum braking force, the second condition being a condition that the first maximum braking force becomes equal to or larger than the second maximum braking force and continues for a first predetermined time, and the third condition being a condition that the first maximum braking force becomes equal to or larger than the cancel threshold value and continues for a second predetermined time. With this configuration, it is possible to suppress hunting (frequent switching) between presence and absence of the notification of the limitation information.

In the above aspect, the controller may be configured not to cause the notification unit to notify the limitation information or to cause the notification unit to end the notification of the limitation information in at least one of a case where a ready-off state is established, a case where a shift position has been changed to a parking position, a case where the shift position has been changed to a neutral position, a case where an abnormality is detected in at least one of a plurality of devices including the motor and the electric power storage device, and a case where an origin learning of a rotation position detection sensor that detects a rotation position of the motor is incomplete.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, modes for carrying out the disclosure will be described using an embodiment.

Figure 1:
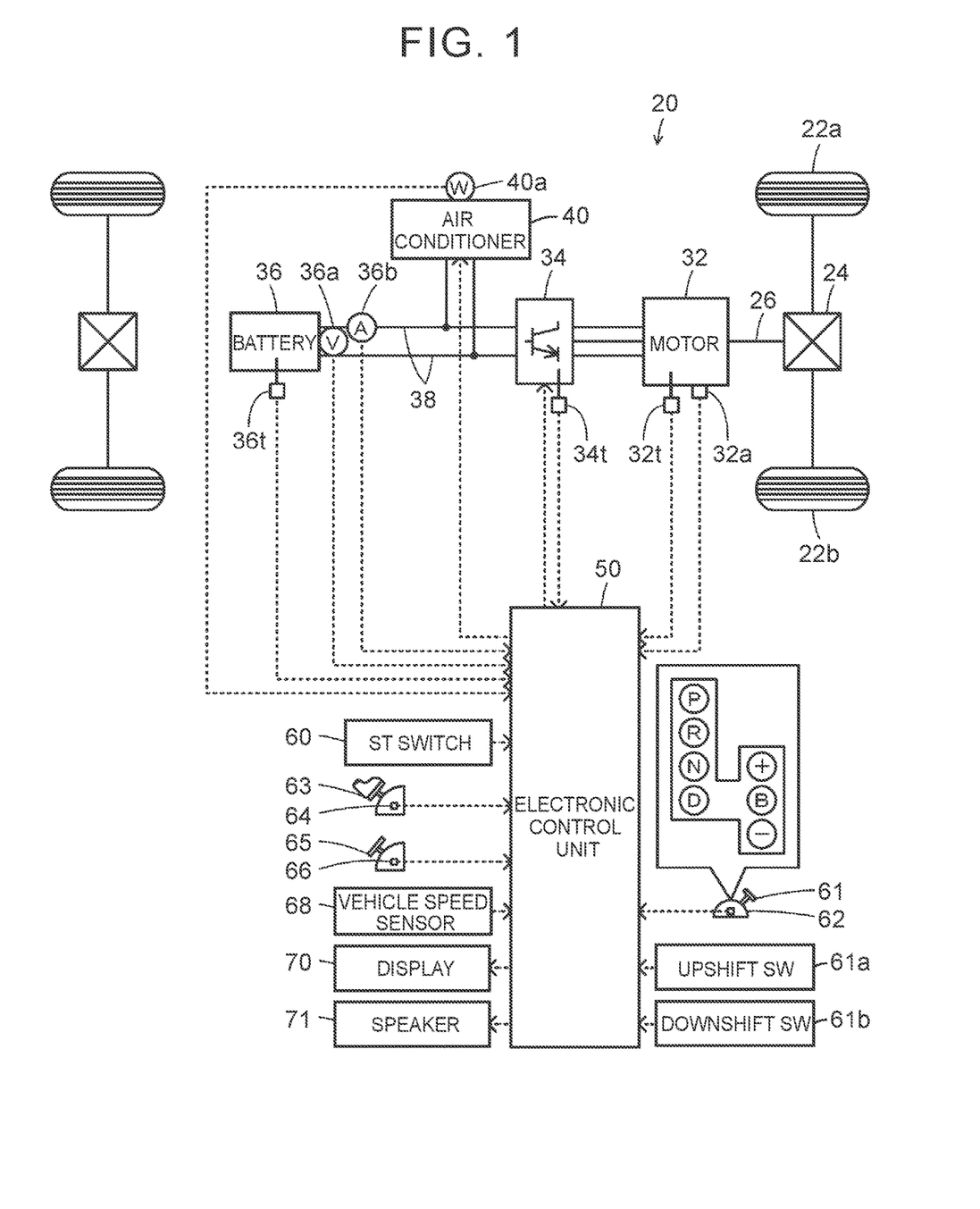
FIG. 1 is a configuration diagram schematically showing a configuration of an electric vehicle 20 serving as an embodiment of the disclosure.

FIG. 1 is a configuration diagram schematically showing a configuration of an electric vehicle 20 serving as an embodiment of the disclosure. As shown in the drawing, the electric vehicle 20 of the embodiment includes a motor 32, an inverter 34, a battery 36 serving as an electric power storage device, an air conditioner 40, and an electronic control unit 50.

The motor 32 is configured as a synchronous generator motor, and includes a rotor in which permanent magnets are embedded in a rotor core, and a stator in which a three-phase coil is wound around a stator core. The rotor of the motor 32 is connected to a drive shaft 26 connected to driving wheels 22a, 22b via a differential gear 24. The inverter 34 is used to drive the motor 32 and is connected to the battery 36 via a power line 38. The electronic control unit 50 controls switching of a plurality of switching elements (not shown) of the inverter 34 such that the motor 32 is rotationally driven.

The battery 36 is configured as, for example, a lithium ion secondary battery or a nickel metal hydride secondary battery. As described above, the battery 36 is connected to the inverter 34 via the power line 38. The air conditioner 40 is connected to the power line 38, and is supplied with electric power to condition the air in the vehicle cabin.

The electronic control unit 50 is configured as a microprocessor having a central processing unit (CPU), a read-only memory (ROM), a random access memory (RAM), a non-volatile memory, and input/output ports. Signals from various sensors are input to the electronic control unit 50 via the input ports. Examples of the signals input to the electronic control unit 50 include a rotation position Om of the rotor of the motor 32 from a rotation position detection sensor (for example, resolver) 32a that detects the rotation position of the rotor of the motor 32, and a phase current of each phase from a current sensor attached to the power line of each phase that connects the motor 32 and the inverter 34. Examples of the signals further include a temperature Tm of the motor 32 from a temperature sensor 32t attached to the motor 32 and a temperature Ti of the inverter 34 from a temperature sensor 34t attached to the inverter 34. Examples of the signals further include a voltage Vb of the battery 36 from a voltage sensor 36a provided between the terminals of the battery 36, a current Ib of the battery 36 from a current sensor 36b attached to an output terminal of the battery 36, a temperature Tb of the battery 36 from a temperature sensor 36t attached to the battery 36, and a power consumption Pac of the air conditioner 40 from a power sensor 40a attached to the air conditioner 40. Examples of the signals further include a start signal from a start switch 60, a shift position SP from a shift position sensor 62 that detects an operating position of a shift lever 61, an accelerator operation amount Acc from an accelerator pedal position sensor 64 that detects an amount of depression of an accelerator pedal 63, a brake pedal position BP from a brake pedal position sensor 66 that detects an amount of depression of a brake pedal 65, and a vehicle speed V from a vehicle speed sensor 68.

Here, examples of the shift position SP include a parking position (P position), a reverse position (R position), a neutral position (N position), a forward position (D position), and a brake position (B position). The B position is a position in which the drive force exhibited when the accelerator is on is the same as that in the D position and the braking force exhibited when the accelerator is off during traveling is changed between a plurality of stages (in the embodiment, three stages of gear stages of B1 to B3). As a result, in the B position, the driver can be given a feeling of deceleration of the virtual stepped transmission when the accelerator is off during traveling. In the embodiment, an upshift signal and a downshift signal are also input to the electronic control unit 50 from an upshift switch 61a and a downshift switch 61b that instruct upshift and downshift of the gear stage when the shift position SP is the B position.

Various control signals are output from the electronic control unit 50 via the output ports. Examples of the signals output from the electronic control unit 50 include a switching control signal to the switching elements of the inverter 34, a control signal to the air conditioner 40, a control signal to a display 70, and a control signal to a speaker 71. The electronic control unit 50 calculates an electric angle θe and a rotation speed Nm of the motor 32 based on the rotation position Om of the rotor of the motor 32 from the rotation position detection sensor 32a, calculates a power storage rate SOC of the battery 36 based on an accumulated value of the current Ib of the battery 36 from the current sensor 36b, and calculates input and output limits Win, Wout of the battery 36 based on the calculated power storage rate SOC of the battery 36 and the temperature Tb of the battery 36 from the temperature sensor 36t. The power storage rate SOC represents a rate of capacity of electric power that can be discharged from the battery 36, with respect to the full capacity of the battery 36. The input and output limits Win, Wout represent allowable charge and discharge power with which the battery 36 is charged and discharged. In the embodiment, the side on which electric power is discharged from the battery 36 is a positive side. Therefore, the input limit Win has a negative value, and the output limit Wout has a positive value.

In the thus configured electric vehicle 20 of the embodiment, the electronic control unit 50 executes an accelerator-on travel control below when the accelerator is on. In the accelerator-on travel control, first, a required torque Td* required for the drive shaft 26 is set based on the shift position SP (the D position, gear stages B1 to B3 of the B position, the R position), the accelerator operation amount Acc, and the vehicle speed V. Subsequently, a torque command Tm* for the motor 32 is set based on the required torque Td*. Then, the switching control of the switching elements of the inverter 34 is performed such that the motor 32 is driven by the torque command Tm*. Since the accelerator-on travel control does not constitute the core of the disclosure, detailed description thereof will be omitted.

Figure 2:
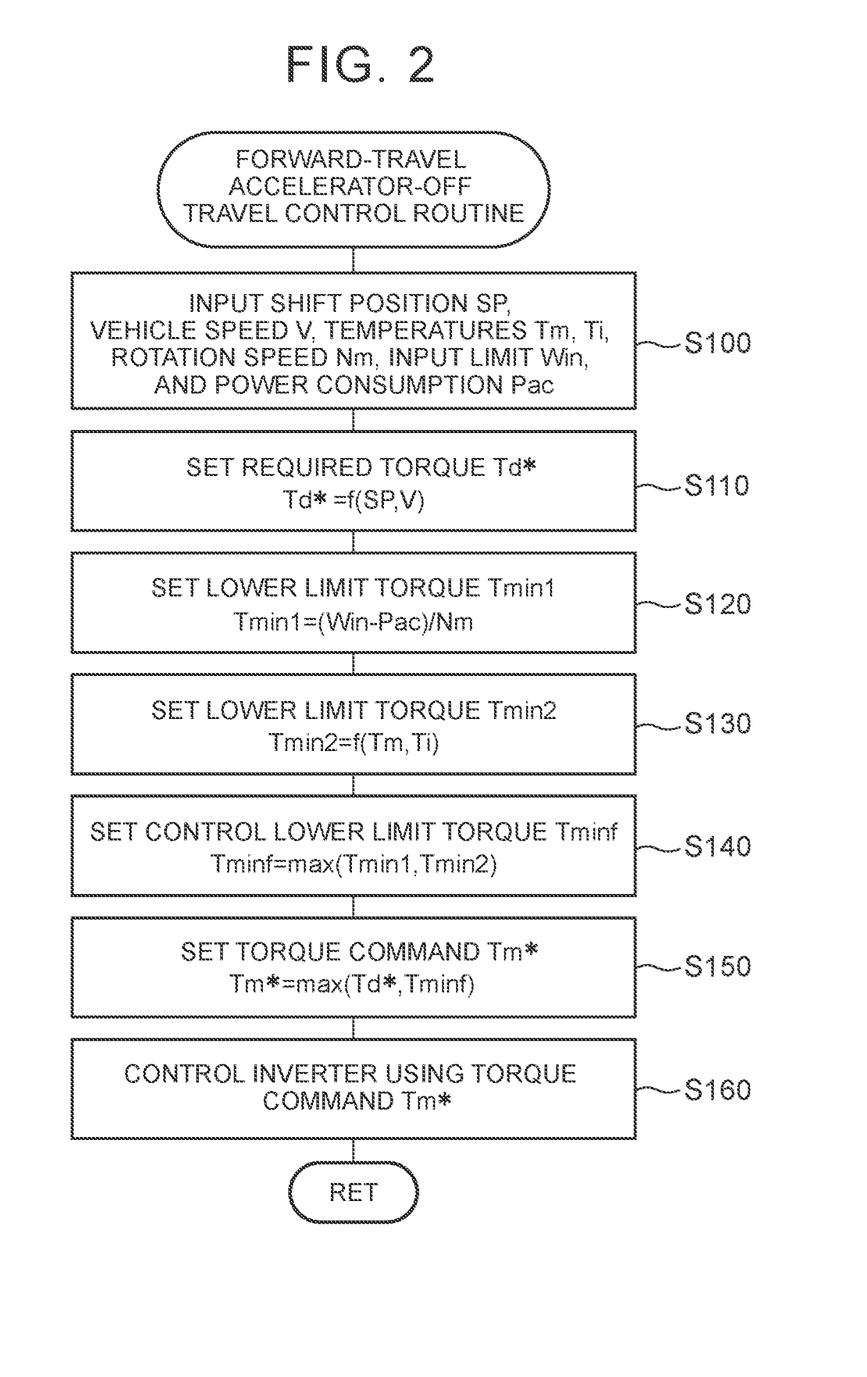
FIG. 2 is a flowchart showing an example of a forward-travel accelerator-off travel control routine.
Figure 3:
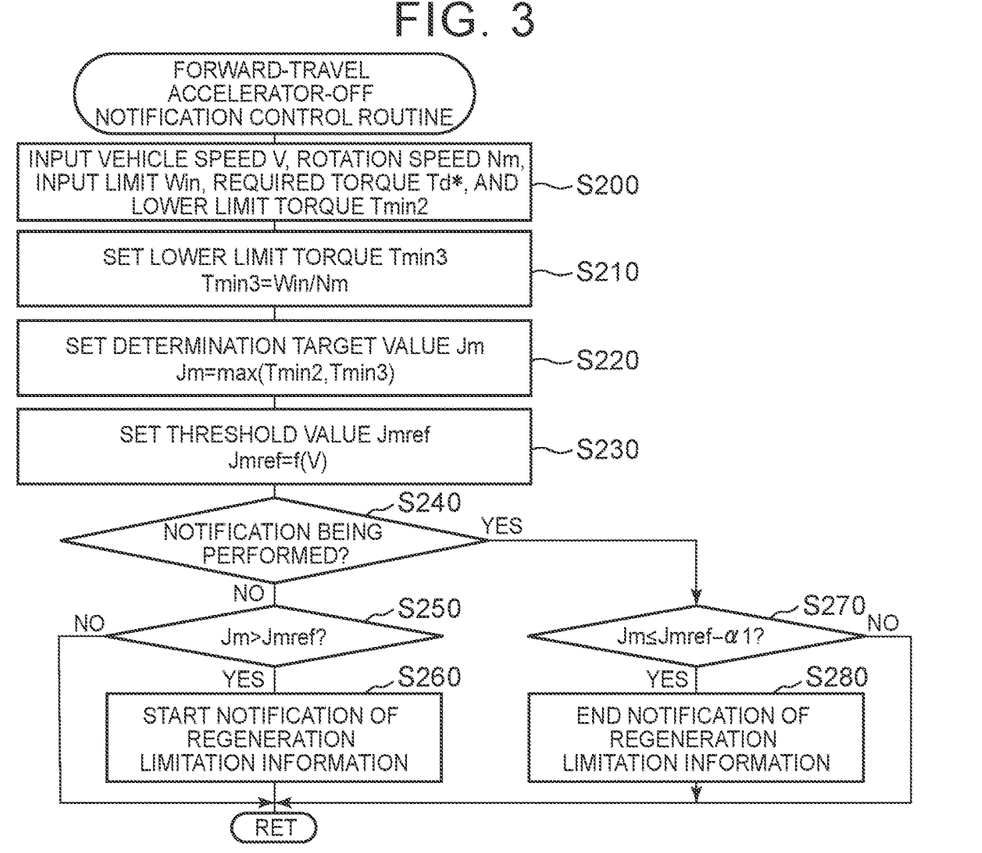
FIG. 3 is a flowchart showing an example of a forward-travel accelerator-off notification control routine.

Next, the operation of the electric vehicle 20 of the embodiment configured as described above, particularly the operation when the accelerator is off (accelerator off and brake off) during traveling will be described. First, the operation when the accelerator is off while the shift position SP is the D position or the B position and the electric vehicle 20 is traveling forward will be described. Then, the operation when the accelerator is off while the shift position SP is the R position and the electric vehicle 20 is traveling backward will be described. FIG. 2 is a flowchart showing an example of a forward-travel accelerator-off travel control routine, and FIG. 3 is a flowchart showing an example of a forward-travel accelerator-off notification control routine. These routines are repeatedly executed by the electronic control unit 50 in parallel when the accelerator is off while the shift position SP is the D position or the B position and the electric vehicle 20 is traveling forward. Hereinafter, the routines will be described in order.

When the forward-travel accelerator-off travel control routine in FIG. 2 is executed, data such as the shift position SP, the vehicle speed V, the rotation speed Nm of the motor 32, the temperatures Tm, Ti of the motor 32 and the inverter 34, the input limit Win of the battery 36, and the power consumption Pac of the air conditioner 40 is first input to the electronic control unit 50 (step S100). A value detected by the shift position sensor 62 is input as the shift position SP. A value detected by the vehicle speed sensor 68 is input as the vehicle speed V. Values detected by the temperature sensors 32t, 34t are input as the temperatures Tm, Ti of the motor 32 and the inverter 34. Values calculated by the electronic control unit 50 are input as the rotation speed Nm of the motor 32 and the input limit Win of the battery 36. A value detected by the power sensor 40a is input as the power consumption Pac of the air conditioner 40.

Figure 4:
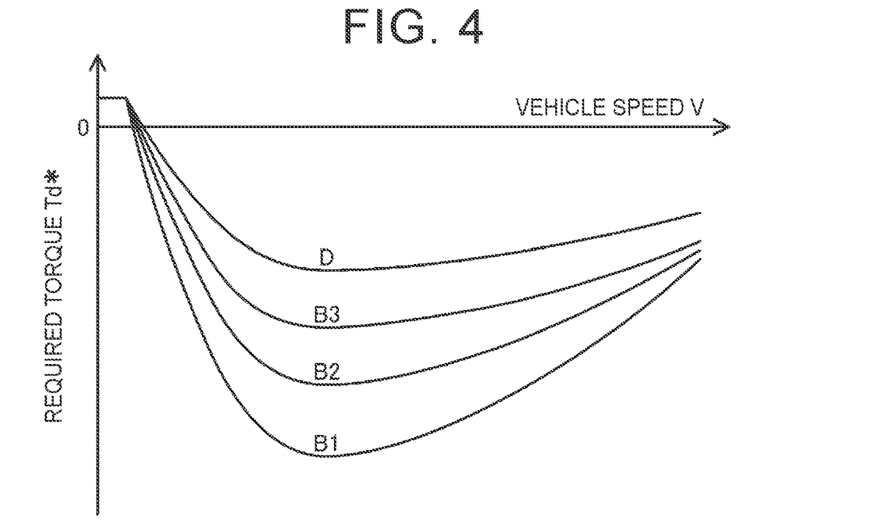
FIG. 4 is an explanatory diagram showing an example of a forward-travel accelerator-off map.

When the data is input in this way, the required torque Td* required for the drive shaft 26 is set using the shift position SP (the D position or the gear stages B1 to B3 of the B position), the vehicle speed V, and a forward-travel accelerator-off map in FIG. 4 (step S110). The forward-travel accelerator-off map in FIG. 4 is determined in advance as a relationship between the shift position SP, the vehicle speed V, and the required torque Td* when the accelerator is off while the shift position SP is the D position or the B position and the electric vehicle 20 is traveling forward. The forward-travel accelerator-off map is stored in the ROM (not shown). The required torque Td* at this time is, as shown in the drawing, set to take a negative value (braking force) except for a vehicle speed region in which a creep torque should be output (around a value of zero). The required torque Td* is set so as to be smaller (larger as the braking force) when the shift position SP is the B position than when the shift position SP is the D position, and so as to be smaller (larger as the braking force) as the gear stage becomes smaller when the shift position SP is the B position.

Then, as shown in Equation (1), a lower limit torque Tmin1 of the motor 32 is set by dividing, by the rotation speed Nm of the motor 32, the power obtained by subtracting the power consumption Pac of the air conditioner 40 from the input limit Win of the battery 36 (step S120). Further, a lower limit torque Tmin2 of the motor 32 is set based on the temperatures Tm, Ti of the motor 32 and the inverter 34 (step S130). The lower limit torque Tmin2 is set so as to be larger (smaller as an absolute value) as the temperatures Tm, Ti of the motor 32 and the inverter 34 are higher, in order to suppress overheating of the motor 32 and the inverter 34.

$$Tmin1 = (Win - Pac)/Nm \qquad \text{Equation (1)}$$

Then, as shown in Equation (2), the maximum value (minimum value as an absolute value) of the lower limit torques Tmin1 and Tmin2 of the motor 32 is set as a control lower limit torque Tminf of the motor 32 (step S140). Then, the required torque Td* is limited with the control lower limit torque Tminf (upper limit guard), and the torque command Tm* of the motor 32 is set (step S150). When the torque command Tm* of the motor 32 is set in this way, the switching control of the switching elements of the inverter 34 is performed such that the motor 32 is driven by the torque command Tm* (step S160), and the routine is ended.

$$Tminf = \max(Tmin1, Tmin2) \qquad \text{Equation (2)}$$

Next, the forward-travel accelerator-off notification control routine of FIG. 3 will be described. When this routine is executed, data such as the vehicle speed V, the rotation speed Nm of the motor 32, the input limit Win of the battery 36, and the lower limit torque Tmin2 of the motor 32 is first input to the electronic control unit 50 (step S200). The vehicle speed V, the rotation speed Nm of the motor 32, and the input limit Win of the battery 36 are input in the same manner as in the process of step S100 of the forward-travel accelerator-off travel control routine in FIG. 2. A value set by the forward-travel accelerator-off travel control routine in FIG. 2 is input as the lower limit torque Tmin2 of the motor 32.

When the data is input in this way, as shown in Equation (3), the input limit Win of the battery 36 is divided by the rotation speed Nm of the motor 32 to set a lower limit torque Tmin3 of the motor 32 (step S210). Here, the lower limit torque Tmin3 of the motor 32 corresponds to a maximum regenerative torque that can be output from the motor 32 when the power consumption Pac of the air conditioner 40 is ignored, that is, when the power consumption Pac of the air conditioner 40 is set to the value of zero in Equation (1).

Thus, when the air conditioner 40 is not operating, that is, when the power consumption Pac of the air conditioner 40 has the value of zero, the lower limit torque Tmin3 of the motor 32 has the same value as the lower limit torque Tmin1 of the motor 32. When the air conditioner 40 is operating, that is, when the power consumption Pac of the air conditioner 40 has a positive value, the lower limit torque Tmin3 of the motor 32 has a value larger (smaller as an absolute value) than the lower limit torque Tmin1 of the motor 32.

$$Tmin3 = Win/Nm \quad \text{Equation (3)}$$

Subsequently, as shown in Equation (4), the maximum value (minimum value as an absolute value) of the lower limit torques Tmin2, Tmin3 of the motor 32 is set as a determination target value Jm (step S220), and a threshold value Jmref is set within a range of the value of zero or less using the vehicle speed V and the forward-travel accelerator-off map (see FIG. 4) (step S230). Here, the determination target value Jm and the threshold value Jmref are a determination target value and a threshold value for determining whether the maximum regenerative torque that can be output from the motor 32 is limited. In the embodiment, the vehicle speed V is applied to the forward-travel accelerator-off map of FIG. 4 to derive the minimum required torque Td* among the required torques Td* of the D position and the gear stages B1 to B3 of the B position, specifically, the required torque Td* of the gear stage B1 of the B position. The derived value is limited with the value of zero (upper limit guard) to set the threshold value Jmref.

$$Jm = \max(Tmin2, Tmin3) \quad \text{Equation (4)}$$

Then, it is determined whether the fact that the maximum regenerative torque that can be output from the motor 32 is limited (hereinafter referred to as "regeneration limitation information") is being notified (step S240). When it is determined that the regeneration limitation information is not being notified, the determination target value Jm is compared with the threshold value Jmref (step S250). When the determination target value Jm is equal to or less than the threshold value Jmref, it is determined that the maximum regenerative torque of the motor 32 is not limited, and the routine is ended.

When the determination target value Jm is larger than the threshold value Jmref in step S250, it is determined that the maximum regenerative torque of the motor 32 is limited, and the notification of the regeneration limitation information is started (step S260). Then, the routine is ended. Here, the notification of the regeneration limitation information is performed by indicating on a display 70 or outputting from a speaker 71 a message "Regenerative brake is being limited. Depress the brake pedal when deceleration is requested", for example. Then, when the brake pedal 65 is depressed by the driver, a braking force is applied to the driving wheels 22a, 22b and driven wheels by a hydraulic brake device (not shown) in addition to or instead of the regenerative drive of the motor 32.

Figure 5:
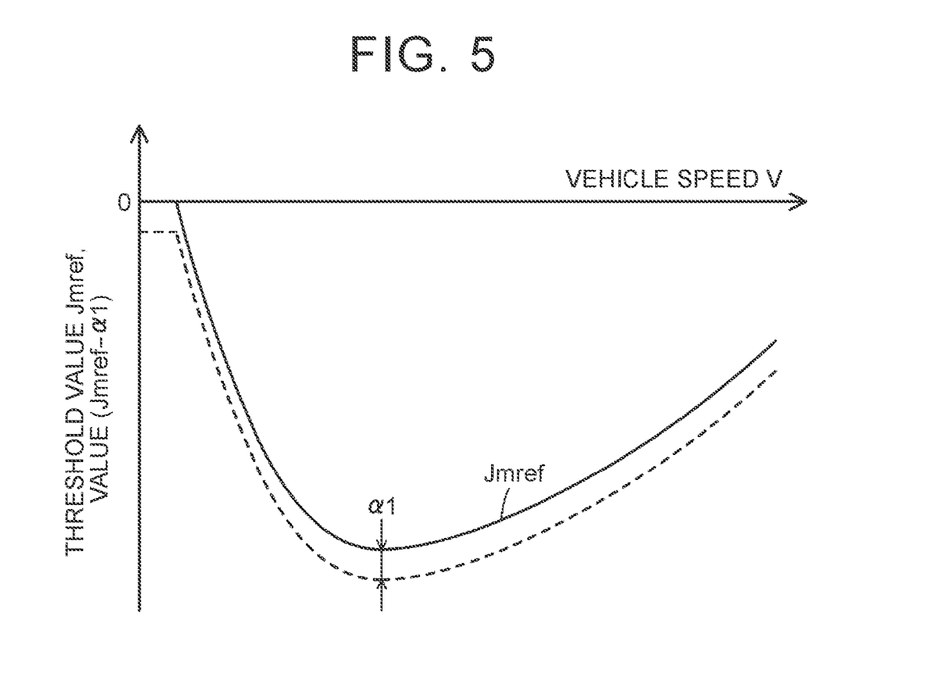
FIG. 5 is an explanatory diagram showing an example of a threshold value Jmref and a value (Jmref−α1)

When it is determined in step S240 that the regeneration limitation information is being notified, the determination target value Jm is compared with a value obtained by subtracting a margin α1 from the threshold value Jmref (Jmref−α1) (step S270). Here, the margin α1 is used to suppress hunting (frequent switching) between presence and absence of the notification of the regeneration limitation information. As the margin α1, for example, a torque corresponding to a change of several km/h$^2$ of the deceleration of the vehicle is used. FIG. 5 is an explanatory diagram showing an example of the threshold value Jmref and the value (Jmref−α1). In FIG. 5, the solid line indicates the threshold value Jmref, and the broken line indicates the value (Jmref−α1).

When the determination target value Jm is larger than the value (Jmref−α1) in step S270, the notification of the regeneration limitation information is continued and the routine is ended. On the other hand, when the determination target value Jm is equal to or less than the value (Jmref−α1), the notification of the regeneration limitation information is ended (step S280), and the routine is ended.

In the embodiment, such processes are executed. Thereby, in the electric vehicle 20 having the traveling positions (the D position, the gear stages B1 to B3 of the B position) with different braking forces exhibited when the accelerator is off during forward traveling, the regeneration limitation information can be notified at a more appropriate timing, when the accelerator is off while the shift position SP is the D position or the B position and the electric vehicle 20 is traveling forward.

For example, in the embodiment, the minimum required torque Td* among the required torques Td* of the D position and the gear stages B1 to B3 of the B position, specifically, the required torque Td* of the gear stage B1 of the B position is set as the threshold value Jmref, rather than the required torque Td* based on the current shift position SP (the required torque Td* set in the process of step S110 of the forward-travel accelerator-off travel control routine in FIG. 2). As a result, when the accelerator is off during forward traveling, it is possible to restrain the relationship of magnitude between the determination target value Jm and the threshold value Jmref or the value (Jmref−α1) from being switched due to the switching operation of the shift position SP between the D position and the B position or the operation of the upshift switch 61a or the downshift switch 61b. Thus, it is possible to restrain the presence or absence of the notification of the regeneration limitation information from switching.

Further, in the embodiment, the determination target value Jm is set using the lower limit torque Tmin3 of the motor 32 ignoring the power consumption Pac of the air conditioner 40, rather than the lower limit torque Tmin1 considering the power consumption Pac of the air conditioner 40. Thereby, when the accelerator is off during forward traveling, it is possible to restrain the relationship of magnitude between the determination target value Jm and the threshold value Jmref or the value (Jmref−α1) from being switched due to the presence or absence of operation or the change in the power consumption Pac of the air conditioner 40. Thus, it is possible to suppress the occurrence of hunting (frequent switching) between presence and absence of the notification of the regeneration limitation information.

Further, in the embodiment, the notification of the regeneration limitation information is started when the determination target value Jm is larger than the threshold value Jmref, and then the notification of the regeneration limitation information is ended when the determination target value Jm becomes equal to or less than the value (Jmref−α1). This also makes it possible to suppress the occurrence of hunting between presence and absence of the notification of regeneration limitation information.

Figure 6:
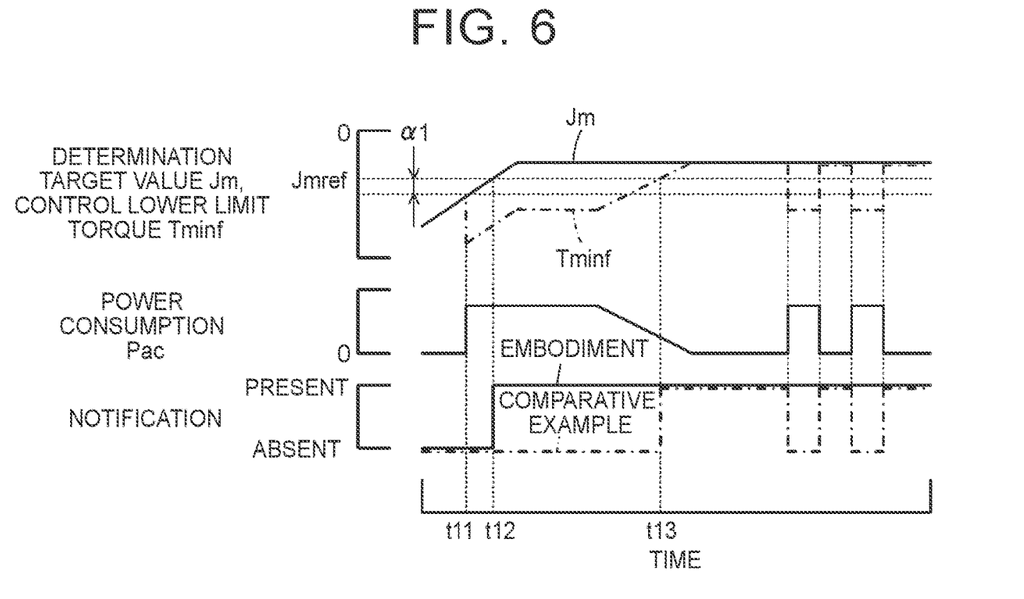
FIG. 6 is an explanatory diagram showing an example of a determination target value Jm, a control lower limit torque Tminf of a motor 32, a power consumption Pac of an air conditioner 40, and presence or absence of a notification of a regeneration limitation information when an accelerator is off while a shift position SP is a D position or a B position and the electric vehicle 20 is traveling forward.

FIG. 6 is an explanatory diagram showing an example of the determination target value Jm, the control lower limit torque Tminf of the motor 32, the power consumption Pac of the air conditioner 40, and the presence or absence of the notification of the regeneration limitation information when the accelerator is off while the shift position SP is the D position or the B position and the electric vehicle 20 is traveling forward. In FIG. 6, solid lines indicate a state of the embodiment, and long dashed short dashed lines indicate a state of a comparative example. In the embodiment, the presence or absence of the notification of the regeneration limitation information is determined by comparing the determination target value Jm with the threshold value Jmref or the value (Jmref−α1), but in the comparative example, the presence or absence of the notification of the regeneration limitation information is determined by comparing the control lower limit torque Tminf of the motor 32 with the threshold value Jmref or the value (Jmref−α1). For simplicity, a case is assumed that the lower limit torque Tmin2 of the motor 32 is sufficiently small (for example, the rated torque on the negative side), the lower limit torque Tmin1 of the motor 32 is set as the control lower limit torque Tminf, and the lower limit torque Tmin3 of the motor 32 is set as the determination target value Jm.

In the comparative example, as shown by the long dashed short dashed lines in FIG. 6, when the operation of the air conditioner 40 starts (time t11), the control lower limit torque Tminf of the motor 32 becomes smaller by the amount of the power consumption Pac of the air conditioner 40 (becomes larger as an absolute value). Then, when the control lower limit torque Tminf of the motor 32 becomes larger than the threshold value Jmref (time t13), the notification of the regeneration limitation information is started. After that, as the control lower limit torque Tminf of the motor 32 becomes equal to or smaller than the value (Jmref−α1) or becomes larger than the threshold value Jmref due to the presence or absence of operation or the change in the power consumption Pac of the air conditioner 40, the notification of regeneration limitation information is ended (interrupted) or resumed. On the other hand, in the embodiment, the notification of the regeneration limitation information is started when the determination target value Jm becomes larger than the threshold value Jmref (time t12). Then, the determination target value Jm becomes larger than the value (Jmref−α1) and the notification of the regeneration limitation information is continued regardless of the presence or absence of operation or the change in the power consumption Pac of the air conditioner 40, as shown by the solid lines in FIG. 6. This makes it possible to suppress the occurrence of hunting between presence and absence of the notification of the regeneration limitation information.

Figure 7:
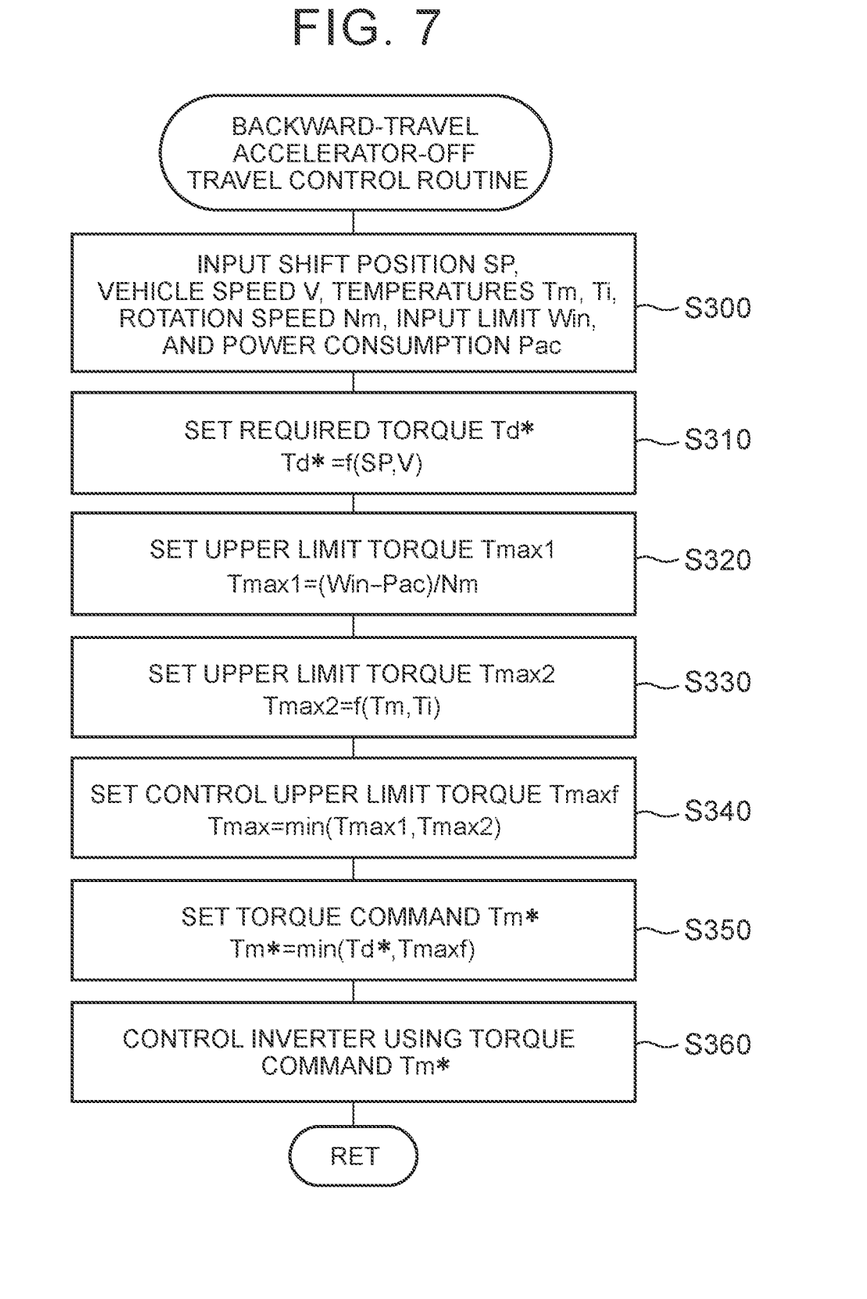
FIG. 7 is a flowchart showing an example of a backward-travel accelerator-off travel control routine.
Figure 8:
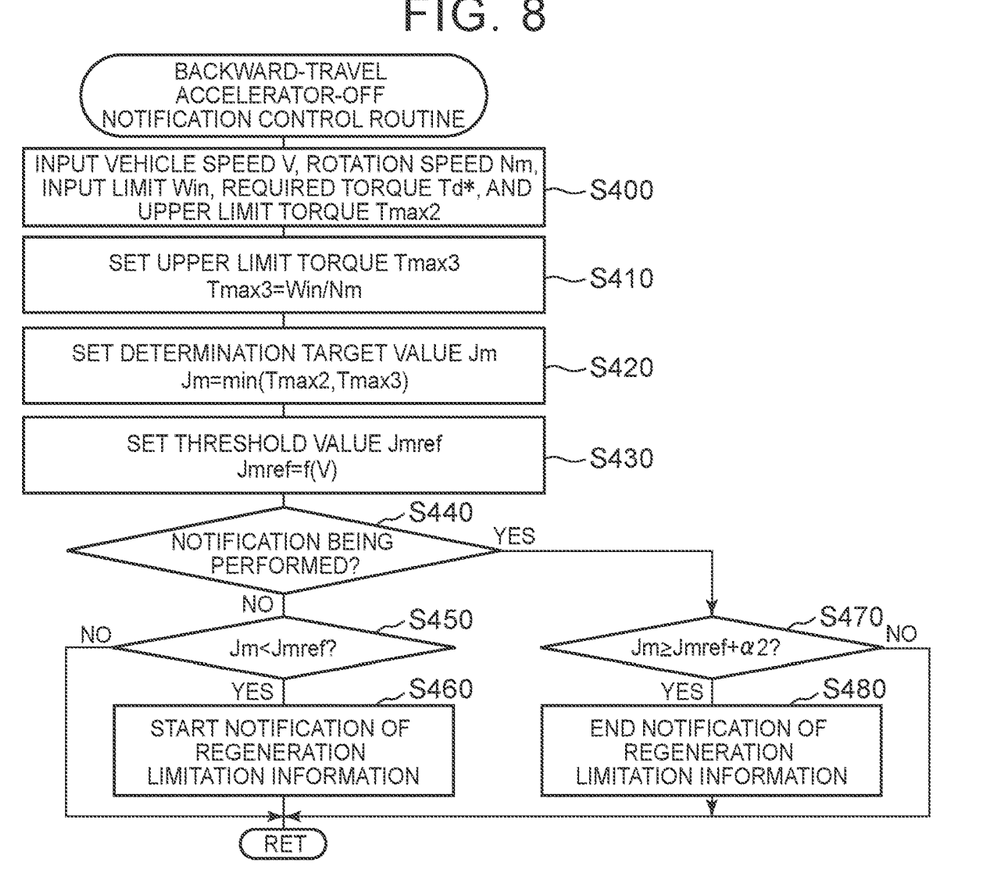
FIG. 8 is a flowchart showing an example of a backward-travel accelerator-off notification control routine.

Next, the operation when the accelerator is off while the shift position SP is the R position and the electric vehicle 20 is traveling backward will be described. FIG. 7 is a flowchart showing an example of a backward-travel accelerator-off travel control routine, and FIG. 8 is a flowchart showing an example of a backward-travel accelerator-off notification control routine. These routines are repeatedly executed by the electronic control unit 50 in parallel when the accelerator is off while the shift position SP is the R position and the electric vehicle 20 is traveling backward. Hereinafter, the routines will be described in order.

When the backward-travel accelerator-off travel control routine in FIG. 7 is executed, data such as the vehicle speed V, the rotation speed Nm of the motor 32, the temperatures Tm, Ti of the motor 32 and the inverter 34, the input limit Win of the battery 36, and the power consumption Pac of the air conditioner 40 is first input to the electronic control unit 50 (step S300). The data is input in the same manner as in the process of step S100 of the forward-travel accelerator-off travel control routine in FIG. 2.

Figure 9:
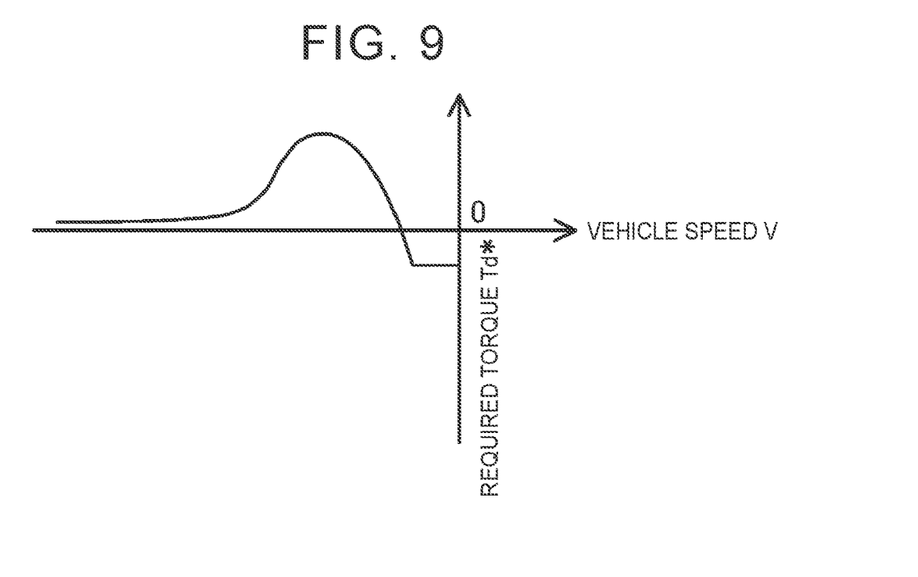
FIG. 9 is an explanatory diagram showing an example of a backward-travel accelerator-off map.

When the data is input in this way, the required torque Td* required for the drive shaft 26 is set using the vehicle speed V and a backward-travel accelerator-off map in FIG. 9 (step S310). The backward-travel accelerator-off map in FIG. 9 is determined in advance as a relationship between the vehicle speed V and the required torque Td* when the accelerator is off while the shift position SP is the R position and the electric vehicle 20 is traveling backward. The backward-travel accelerator-off map is stored in the ROM (not shown). As shown in FIG. 9, the required torque Td* here is set to be a positive value (braking force) except for the vehicle speed region where creep torque should be output (near the value of zero).

Then, as shown in Equation (5), an upper limit torque Tmax1 of the motor 32 is set by dividing electric power obtained by subtracting the power consumption Pac of the air conditioner 40 from the input limit Win of the battery 36 by the rotation speed Nm of the motor 32 (step S320). Although the right sides of Equations (1) and (5) are the same, the rotation speed Nm of the motor 32 has a positive value during forward traveling, whereas the rotation speed Nm of the motor 32 has a negative value during backward traveling. Therefore, the lower limit torque Tmin1 of the motor 32 is obtained by Equation (1), whereas the upper limit torque Tmax1 of the motor 32 is obtained by Equation (5).

$$Tmax1=(Win-Pac)/Nm \qquad \text{Equation (5)}$$

Further, an upper limit torque Tmax2 of the motor 32 is set based on the temperatures Tm, Ti of the motor 32 and the inverter 34 (step S330). The upper limit torque Tmax2 is set so as to be smaller as the temperatures Tm, Ti of the motor 32 and the inverter 34 are higher, in order to suppress overheating of the motor 32 and the inverter 34.

Then, as shown in Equation (6), the minimum value of the upper limit torques Tmax1 and Tmax2 of the motor 32 is set as a control upper limit torque Tmaxf of the motor 32 (step S340). Then, the required torque Td* is limited with the control upper limit torque Tmaxf (upper limit guard), and the torque command Tm* of the motor 32 is set (step S350). When the torque command Tm* of the motor 32 is set in this way, the switching control of the switching elements of the inverter 34 is performed such that the motor 32 is driven by the torque command Tm* (step S360), and the routine is ended.

$$Tmaxf=min(Tmax1, Tmax2) \qquad \text{Equation (6)}$$

Next, the backward-travel accelerator-off notification control routine of FIG. 8 will be described. When this routine is executed, data such as the vehicle speed V, the rotation speed Nm of the motor 32, the input limit Win of the battery 36, and the upper limit torque Tmax2 of the motor 32 is first input to the electronic control unit 50 (step S400). The vehicle speed V, the rotation speed Nm of the motor 32, and the input limit Win of the battery 36 are input in the same manner as in the process of step S100 of the forward-travel accelerator-off travel control routine in FIG. 2. A value set by the backward-travel accelerator-off travel control routine in FIG. 7 is input as the upper limit torque Tmax2 of the motor 32.

When the data is input in this way, as shown in Equation (7), the input limit Win of the battery 36 is divided by the rotation speed Nm of the motor 32 to set an upper limit torque Tmax3 of the motor 32 (step S410). Here, the upper limit torque Tmax3 of the motor 32 corresponds to a maximum regenerative torque that can be output from the motor 32 when the power consumption Pac of the air conditioner 40 is ignored, that is, when the power consumption Pac of the air conditioner 40 is set to the value of zero in Equation (5). Thus, when the air conditioner 40 is not operating, that is, when the power consumption Pac of the air conditioner 40 has the value of zero, the upper limit torque Tmax3 of the motor 32 has the same value as the upper limit torque Tmax1 of the motor 32. When the air conditioner 40 is operating, that is, when the power consumption Pac of the air conditioner 40 has a positive value, the upper limit torque Tmax3 of the motor 32 has a value smaller than the upper limit torque Tmax1 of the motor 32.

$$Tmax3=Win/Nm \qquad \text{Equation (7)}$$

Subsequently, as shown in Equation (8), the minimum value of the upper limit torques Tmax2, Tmax3 of the motor 32 is set as the determination target value Jm (step S420), and the threshold value Jmref is set within a range of the value of zero or more using the vehicle speed V and the backward-travel accelerator-off map (see FIG. 9) (step S430). Here, the meanings of the determination target value Jm and the threshold value Jmref are the same as those of the forward-travel accelerator-off notification control routine in FIG. 3. In the embodiment, the vehicle speed V is applied to the backward-travel accelerator-off map in FIG. 9 to derive the required torque Td* of the R position, and the derived value is limited with the value of zero (lower limit guard) to set the threshold value Jmref.

$$Jm=min(Tmax2, Tmax3) \qquad \text{Equation (8)}$$

Then, it is determined whether the regeneration limitation information is being notified (step S440), and when it is determined that the regeneration limitation information is not being notified, the determination target value Jm is compared with the threshold value Jmref (step S450). When the determination target value Jm is equal to or more than the threshold value Jmref, it is determined that the maximum regenerative torque of the motor 32 is not limited, and the routine is ended. On the other hand, when the determination target value Jm is less than the threshold value Jmref, it is determined that the maximum regenerative torque of the motor 32 is limited, and the notification of the regeneration limitation information is started (step S460). Then, the routine is ended. The method of notifying the regeneration limitation information has been described above.

Figure 10:
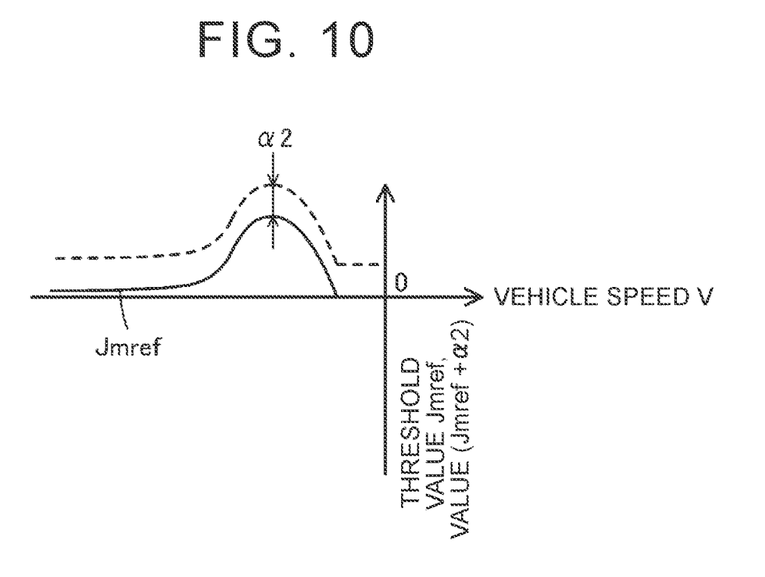
FIG. 10 is an explanatory diagram showing an example of the threshold value Jmref and a value (Jmref+α2)

When it is determined in step S440 that the regeneration limitation information is being notified, the determination target value Jm is compared with a value obtained by adding a margin α2 to the threshold value Jmref (Jmref+α2) (step S470). Here, like the margin α1, the margin α2 is used to suppress hunting between presence and absence of the notification of the regeneration limitation information. As the margin α2, for example, the same value as the margin α1 or a value slightly smaller than the margin α1 is used. FIG. 10 is an explanatory diagram showing an example of the threshold value Jmref and the value (Jmref+α2). In FIG. 10, the solid line indicates the threshold value Jmref, and the broken line indicates the value (Jmref+α2).

When the determination target value Jm is less than the value (Jmref+α2) in step S470, the notification of the regeneration limitation information is continued and the routine is ended. On the other hand, when the determination target value Jm is equal to or larger than the value (Jmref+α2), the notification of the regeneration limitation information is ended (step S480), and the routine is ended.

With such processes, the regeneration limitation information can be notified at a more appropriate timing even when the accelerator is off while the shift position SP is the R position and the electric vehicle 20 is traveling backward. For example, in the embodiment, the determination target value Jm is set using the upper limit torque Tmax3 of the motor 32 ignoring the power consumption Pac of the air conditioner 40, rather than the upper limit torque Tmax1 considering the power consumption Pac of the air conditioner 40. Thereby, when the accelerator is off during backward traveling, it is possible to restrain the relationship of magnitude between the determination target value Jm and the threshold value Jmref or the value (Jmref+α2) from being switched due to the presence or absence of operation or the change in the power consumption Pac of the air conditioner 40. Thus, it is possible to suppress the occurrence of hunting between presence and absence of the notification of the regeneration limitation information.

Further, in the embodiment, the notification of the regeneration limitation information is started when the determination target value Jm is smaller than the threshold value Jmref, and then the notification of the regeneration limitation information is ended when the determination target value Jm becomes equal to or larger than the value (Jmref+α2). This also makes it possible to suppress the occurrence of hunting between presence and absence of the notification of regeneration limitation information.

Figure 11:
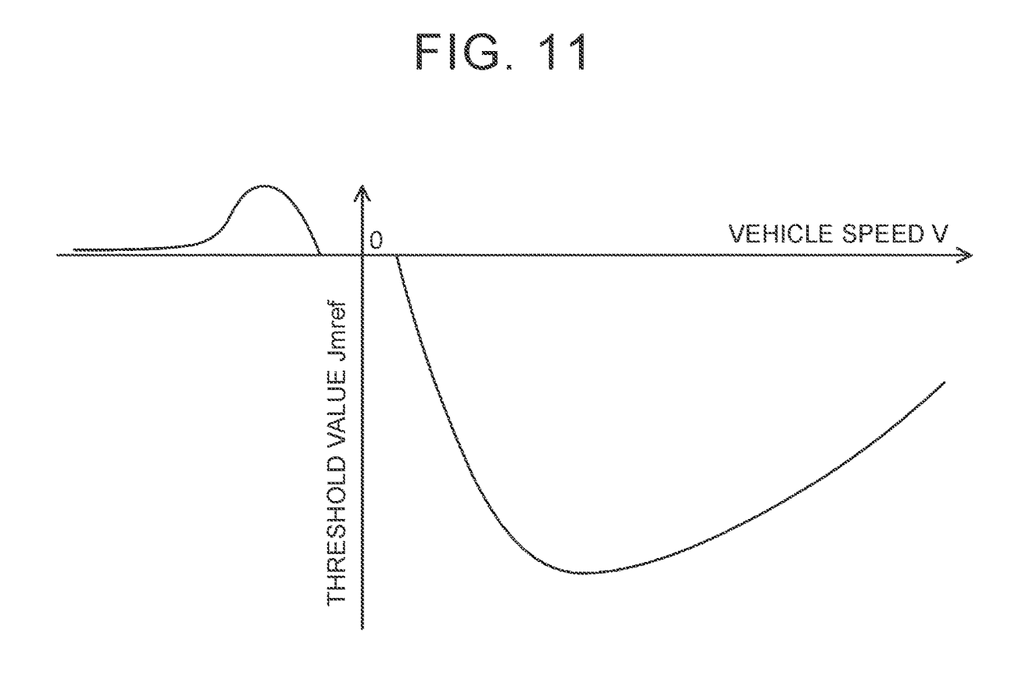
FIG. 11 is an explanatory diagram in which the example of the threshold value Jmref in FIG. 5 and the example of the threshold value Jmref in FIG. 10 are combined into one.

FIG. 11 is an explanatory diagram in which the example of the threshold value Jmref in FIG. 5 and the example of the threshold value Jmref in FIG. 10 are combined into one. Based on the forward-travel accelerator-off notification control routine of FIG. 3, the backward-travel accelerator-off travel control routine of FIG. 7, and FIG. 11, the following can be understood. That is, when the shift position SP is the D position or the B position, the threshold value Jmref in the region where the vehicle speed V is positive (value of zero or negative value) may be used, and when the shift position SP is the R position, the threshold value Jmref in the region where the vehicle speed V is negative (value of zero or a positive value) may be used.

In the electric vehicle 20 of the embodiment described above, when the accelerator is off while the shift position SP is the D position or the B position and the electric vehicle 20 is traveling forward, the minimum required torque Td* among the required torques Td* of the D position and the gear stages B1 to B3 of the B position, specifically, the required torque Td* of the gear stage B1 of the B position is set as the threshold value Jmref. Then, when the determination target value Jm is larger than the threshold value Jmref, the regeneration limitation information is notified. After that, when the determination target value Jm becomes equal to or less than the value (Jmref−α1), the notification of the regeneration limitation information is ended. As a result, when the accelerator is off during forward traveling, it is possible to restrain the relationship of magnitude between the determination target value Jm and the threshold value Jmref or the value (Jmref−α1) from being switched due to the switching operation of the shift position SP between the D position and the B position or the operation of the upshift switch 61a or the downshift switch 61b, and thus, it is possible to restrain the presence or absence of the notification of regeneration limitation information from switching, compared with the case where the required torque Td* based on the current shift position SP is set as the determination target value Jm.

In the electric vehicle 20 of the embodiment, when the accelerator is off while the shift position SP is the D position or the B position and the electric vehicle 20 is traveling forward, the determination target value Jm is set using the lower limit torque Tmin3 of the motor 32 ignoring the power consumption Pac of the air conditioner 40. Thereby, when the accelerator is off during forward traveling, it is possible to restrain the relationship of magnitude between the determination target value Jm and the threshold value Jmref or the value (Jmref−α1) from being switched due to the presence or absence of operation or the change in the power consumption Pac of the air conditioner 40, and thus, it is possible to suppress the occurrence of hunting between presence and absence of the notification of the regeneration limitation information, compared with the case where the determination target value Jm is set using the lower limit torque Tmin1 considering the power consumption Pac of the air conditioner 40.

Further, when the accelerator is off while the shift position SP is the R position and the electric vehicle 20 is traveling backward, the determination target value Jm is set using the upper limit torque Tmax3 of the motor 32 ignoring the power consumption Pac of the air conditioner 40. Thereby, when the accelerator is off during backward traveling, it is possible to restrain the relationship of magnitude between the determination target value Jm and the threshold value Jmref or the value (Jmref+α2) from being switched due to the presence or absence of operation or the change in the power consumption Pac of the air conditioner 40, and thus, it is possible to suppress the occurrence of hunting between presence and absence of the notification of the regeneration limitation information, compared with the case where the determination target value Jm is set using the upper limit torque Tmax1 considering the power consumption Pac of the air conditioner 40.

In the electric vehicle 20 of the embodiment, when the accelerator is off while the shift position SP is the D position or the B position and the electric vehicle 20 is traveling forward, the determination target value Jm is set using the lower limit torque Tmin3 of the motor 32 ignoring the power consumption Pac of the air conditioner 40. However, the determination target value Jm may be set using the lower limit torque Tmin1 considering the power consumption Pac of the air conditioner 40. Further, in the embodiment, when the accelerator is off while the shift position SP is the R position and the electric vehicle 20 is traveling backward, the determination target value Jm is set using the upper limit torque Tmax3 of the motor 32 ignoring the power consumption Pac of the air conditioner 40. However, the determination target value Jm may be set using the upper limit torque Tmax1 considering the power consumption Pac of the air conditioner 40.

In the electric vehicle 20 of the embodiment, when the accelerator is off while the shift position SP is the D position or the B position and the electric vehicle 20 is traveling forward, the determination target value Jm is set using the lower limit torque Tmin3 of the motor 32 ignoring the power consumption Pac of the air conditioner 40. Then, the description of whether to consider or ignore the influence of the electric power equipment other than the air conditioner 40, excluding the motor 32, the inverter 34, and the battery 36, which is connected to or provided on the power line 38, is omitted. However, it is preferable to ignore the influence of the electric power equipment other than the air conditioner 40. This is for the same reason as that for ignoring the power consumption Pac of the air conditioner 40. Examples of the influence of the electric power equipment other than the air conditioner 40 include power consumption (loss) of the direct current-direct current (DC-DC) converter that steps down the voltage of electric power of the power line 38 and supplies the electric power to a low voltage power line to which a low voltage battery, low voltage system auxiliary equipment, etc. are connected, and electric power supplied from the power line 38 to the low voltage power line by the DC-DC converter. Examples of the influence further include power consumption (loss) of a boost converter that can boost the voltage of electric power on the battery 36 side and supply the electric power to the inverter 34 side when the boost converter is provided between the inverter 34 and the battery 36, the air conditioner 40, etc. on the power line 38. Although the influence of the electric power equipment is not incorporated in the setting of the lower limit torque Tmin3 of the motor 32, it is preferable to incorporate the influence in the setting of the lower limit torque Tmin1 of the motor 32.

In the electric vehicle 20 of the embodiment, fixed values are used for the margin α1 and the margin α2 used for suppressing the hunting between presence and absence of the notification of the regeneration limitation information (see FIGS. 5 and 10). However, the margin α1 and the margin α2 may be set based on the vehicle speed V or the like. For example, the margin α1 and the margin α2 may be set to the value of zero or a sufficiently small value in the vehicle speed region where the creep torque should be output (around the value of zero), and may be set to large values to some extent in the other regions.

In the electric vehicle 20 of the embodiment, when the accelerator is off while the shift position SP is the D position or the B position and the electric vehicle 20 is traveling forward, the notification of the regeneration limitation information is ended when the determination target value Jm becomes equal to or less than the value (Jmref−α1) during the notification of the regeneration limitation information. However, the notification of the regeneration limitation information may be ended when the determination target value Jm becomes equal to or less than the threshold value Jmref and continues for a predetermined time T1, or the notification of the regeneration limitation information may be ended when the determination target value Jm becomes equal to or less than the value (Jmref−α1) and continues for a predetermined time T2. Here, like the margin α1, the predetermined times T1, T2 are used for suppressing the hunting between presence and absence of the notification of the regeneration limitation information. As the predetermined times T1, T2, for example, about several seconds are used. This also makes it possible to suppress the occurrence of hunting between presence and absence of the notification of the regeneration limitation information. When the determination target value Jm becomes equal to or less than the threshold value Jmref, the notification of the regeneration limitation information may be ended.

In the embodiment, when the accelerator is off while the shift position SP is the R position and the electric vehicle 20 is traveling backward, the notification of the regeneration limitation information is ended when the determination target value Jm becomes equal to or larger than the value (Jmref+α2) during the notification of the regeneration limitation information. However, the notification of the regeneration limitation information may be ended when the determination target value Jm becomes equal to or larger than the threshold value Jmref and continues for a predetermined time T3, or the notification of the regeneration limitation information may be ended when the determination target value Jm becomes equal to or larger than the value (Jmref+α2) and continues for a predetermined time T4. Here, like the margin α2, the predetermined times T3, T4 are used for suppressing the hunting between presence and absence of the notification of the regeneration limitation information. As the predetermined times T3, T4, for example, the same times as the predetermined times T1, T2, or the like are used. This also makes it possible to suppress the occurrence of hunting between presence and absence of the notification of the regeneration limitation information. The notification of the regeneration limitation information may be ended when the determination target value Jm becomes equal to or larger than the threshold value Jmref.

In the electric vehicle 20 of the embodiment, the control of the disclosure, in particular, the control of the forward-travel accelerator-off notification control routine of FIG. 3 is applied to a vehicle in which the gear stage to be used can be selected from the gear stages B1 to B3 of the B position by operating the upshift switch 61a and the shift position sensor 62 during traveling. However, the control of the disclosure may be applied to a vehicle in which the gear stage to be used can be selected from the gear stages B1 to B3 of the B position only while the vehicle is stopped (a vehicle in which the change between the gear stages B1 to B3 of the B position is prohibited during traveling). In this case, in the process of step S230 of the forward-travel accelerator-off notification control in FIG. 3, the vehicle speed V may be applied to the forward-travel accelerator-off map of FIG. 4 to derive the minimum required torque Td* among the required torques Td* of the D position and the gear stages B1 to B3 of the B position, specifically, the required torque Td* of the gear stage B1 of the B position, as in the embodiment. The derived value is limited with a value of zero (upper limit guard) to set the threshold value Jmref. Further, unlike the embodiment, the vehicle speed V may be applied to the forward-travel accelerator-off map in FIG. 4 to derive the required torque Td* for the currently selected gear stage (gear stage selected while the vehicle is stopped) among the gear stages B1 to B3 of the B position, and the derived value may be limited with a value of zero (upper limit guard) to set the threshold value Jmref. In the vehicle in which the gear stage to be used can be selected from the gear stages B1 to B3 of the B position only while the vehicle is stopped, the gear stage is not changed in the B position when the accelerator is off while the vehicle is traveling forward. Therefore, the threshold value Jmref may be set based on the required torque Td* of the currently selected gear stage, rather than the required torque Td* of the gear stage B1 of the B position.

Figure 12:
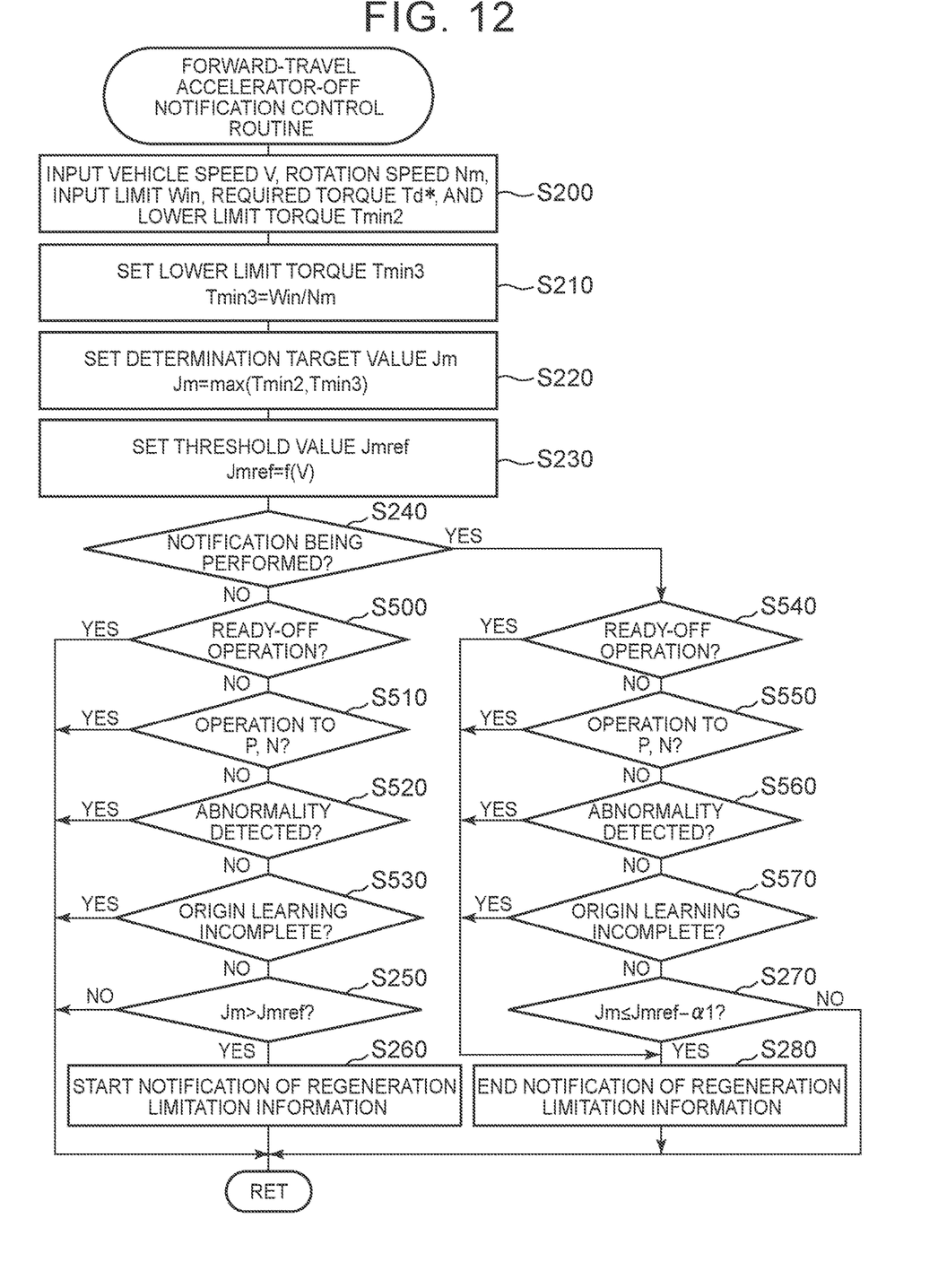
FIG. 12 is a flowchart showing an example of the forward-travel accelerator-off notification control routine.

In the electric vehicle 20 of the embodiment, the electronic control unit 50 executes the forward-travel accelerator-off notification control routine of FIG. 3. However, instead of this, the electronic control unit 50 may execute the forward-travel accelerator-off notification control routine of FIG. 12. The forward-travel accelerator-off notification control routine of FIG. 12 is the same as the forward-travel accelerator-off notification control routine of FIG. 3 except that the processes of steps S500 to S570 are added. Thus, processes in the forward-travel accelerator-off notification control routine of FIG. 12 that are the same as those of the forward-travel accelerator-off notification control routine of FIG. 3 are denoted by the same step numbers, and detailed description thereof will be omitted.

In the forward-travel accelerator-off control routine of FIG. 12, when the electronic control unit 50 determines in step S240 that the regeneration limitation information is not being notified, the electronic control unit 50 determines whether the start switch 60 is operated and a ready-off state is established (drive of the motor 32 is stopped) (step S500), whether the shift position SP has been changed to the P position or an N position (step S510), whether an abnormality has been detected in at least one of the devices such as the motor 32, the inverter 34, and the battery 36 (step S520), and whether an origin learning of the rotation position detection sensor 32a is incomplete (step S530).

Then, when it is determined in step S500 that the ready-off state has been established, when it is determined in step S510 that the shift position SP has been changed to the P position or the N position, when it is determined in step S520 that an abnormality has been detected in at least one of the devices, or when it is determined in step S530 that the origin learning of the rotation position detection sensor 32a is incomplete, the processes in step S250, S260 are not executed and the routine is ended.

When the ready-off state is established or the shift position SP is operated to the P position or the N position, the regenerative driving of the motor 32 is ended. Therefore, it is not necessary to determine whether the maximum regenerative torque that can be output from the motor 32 is limited, and thus, it is not necessary to notify the regeneration limitation information. Thus, in this modification, the regeneration limitation information is not notified. In these cases, since the shift position SP is other than the D position and the B position, the repeated execution of this routine may be ended. When an abnormality has been detected in at least one of the devices, it is necessary to deal with the abnormality. For example, it is necessary to notify the abnormality information or store the history thereof in the non-volatile memory. In order to give priority to this, the regeneration limitation information is not notified in this modification. Examples of the case where the origin learning of the rotation position detection sensor 32a is incomplete include a case before shipment from the factory (for example, when the rotation position detection sensor 32a is assembled) or a case during maintenance (for example, when the rotation position detection sensor 32a is replaced). When the regeneration limitation information is notified in these cases, workers may be confused. Therefore, the regeneration limitation information is not notified in this modification.

When it is determined in step S500 that the ready-off state is not established, when it is determined in step S510 that the shift position SP has not been changed to the P position or the N position, when it is determined in step S520 that no abnormality has been detected in any of the devices, and when it is determined in step S530 that the origin learning of the rotation position detection sensor 32a is complete, the processes in step S250 and thereafter are executed.

When it is determined in step S240 that the regeneration limitation information is being notified, it is determined whether the ready-off state is established (step S540), whether the shift position SP has been changed to the P position or the N position (step S550), whether an abnormality has been detected in at least one of the devices such as the motor 32, the inverter 34, and the battery 36 (step S560), and whether the origin learning of the rotation position detection sensor 32a is incomplete (step S570), like the processes in steps S500 to S530.

When it is determined in step S540 that the ready-off state has been established, when it is determined in step S550 that the shift position SP has been changed to the P position or the N position, when it is determined in step S560 that an abnormality has been detected in at least one of the devices, or when it is determined in step S570 that the origin learning of the rotation position detection sensor 32a is incomplete, the process in step S270 is not executed, and the notification of the regeneration limitation information is ended (step S280). Then, the routine is ended. When the ready-off state is established or the shift position SP has been changed to the P position or the N position, the repeated execution of this routine may be ended after the notification of the regeneration limitation information is ended.

When it is determined in step S540 that the ready-off state is not established, when it is determined in step S550 that the shift position SP has not been changed to the P position or the N position, when it is determined in step S560 that no abnormality has been detected in any of the devices, and when it is determined in step S570 that the origin learning of the rotation position detection sensor 32a is complete, the processes in step S270 and thereafter are executed.

In the forward-travel accelerator-off notification control routine of FIG. 12, the processes of steps S500 to S530 and the processes of steps S540 to S570 are added to the forward-travel accelerator-off notification control routine of FIG. 3. However, only part of these, for example, only the processes of steps S500, S510, S540, S550, etc. may be added. Further, at least part of the processes of steps S500 to S530 and the processes of steps S540 to S570 of the forward-travel accelerator-off notification control routine in FIG. 12 may be added to the backward-travel accelerator-off notification control routine in FIG. 8.

In the electric vehicle 20 of the embodiment, the battery 36 is used as the electric power storage device, but a capacitor may be used instead.

In the embodiment, the motor 32 is an example of a "motor", the battery 36 is an example of an "electric power storage device", and the electronic control unit 50 is an example of a "controller".

The embodiment is merely a specific example of the disclosure.

Although the modes for carrying out the disclosure have been described above with the embodiment, the disclosure is not limited to the embodiment, and may be embodied in various modes without departing from the scope of the disclosure.

The disclosure can be used in the manufacturing industry of electric vehicles and the like.

What is claimed is:

1. An electric vehicle comprising:
   a motor
   an electric power storage device configured to supply and receive electric power to and from the motor;
   a shift position sensor configured to detect a current shift position among a plurality of shift positions, the shift positions including a plurality of traveling positions and at least one non-traveling position;
   a notification unit configured to indicate information;
   a controller configured to
      control the motor such that, when an accelerator is off, a braking force acts on the electric vehicle, an amount of the braking force corresponding to the current shift position, and
      cause the notification unit to indicate a notification that a maximum braking force is limited, in response to determining that a maximum braking force amount output from the motor is less than a largest braking force information corresponding to any shift position among the plurality of the shift positions; and
   electric power equipment connected to a power line configured to connect the motor and the electric power storage device, wherein the controller is configured to set the maximum braking force amount without considering at least one of power consumption and loss of the electric power equipment, and wherein the electric power equipment is an air conditioner configured to condition air in a vehicle cabin.

2. The electric vehicle according to claim 1, wherein:
   the largest braking force information is an amount of a braking force corresponding to a shift position for forward traveling, among the plurality of the shift positions, when a vehicle speed is positive; and
   the largest braking force information is an amount of a braking force corresponding to a shift position for backward traveling, among the plurality of the shift positions, when the vehicle speed is negative.

3. The electric vehicle according to claim 1, wherein the controller is configured, while the notification is being indicated by the notification unit, to cause the notification unit to end the indication of the notification when any one of a first condition, a second condition, and a third condition is satisfied, the first condition being a condition that the maximum braking force amount becomes equal to or larger than a cancel threshold value that is larger than the largest braking force information, the second condition being a condition that the maximum braking force amount becomes equal to or larger than the largest braking force information and continues for a first predetermined time, and the third condition being a condition that the maximum braking force amount becomes equal to or larger than the cancel threshold value and continues for a second predetermined time.

4. The electric vehicle according to claim 1, wherein the controller is configured not to cause the notification unit to indicate the notification or to cause the notification unit to end the indication of the notification in at least one of a case where a ready-off state is established, a case where the shift position has been changed to a parking position, a case where the shift position has been changed to a neutral position, a case where an abnormality is detected in at least one of a plurality of devices including the motor and the electric power storage device, and a case where an origin learning of a rotation position detection sensor that detects a rotation position of the motor is incomplete.

5. The electric vehicle according to claim 1, wherein the current shift position is an operating position of a shift lever operated by a driver.

6. The electric vehicle according to claim 1, wherein the largest braking force information is a largest value among different values for the plurality of the shift positions.

* * * * *